United States Patent
Mahieu

(10) Patent No.: US 12,221,377 B2
(45) Date of Patent: Feb. 11, 2025

(54) TEMPERABLE UV REFLECTING COATED GLASS SHEET

(71) Applicant: AGC GLASS EUROPE, Louvain-la-Neuve (BE)

(72) Inventor: Stijn Mahieu, Lovendegem (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 175 days.

(21) Appl. No.: 18/042,625

(22) PCT Filed: Sep. 8, 2021

(86) PCT No.: PCT/EP2021/074698
§ 371 (c)(1),
(2) Date: Feb. 23, 2023

(87) PCT Pub. No.: WO2022/053507
PCT Pub. Date: Mar. 17, 2022

(65) Prior Publication Data
US 2023/0365460 A1     Nov. 16, 2023

(30) Foreign Application Priority Data

Sep. 10, 2020 (EP) .................................. 20195572

(51) Int. Cl.
*C03C 17/34* (2006.01)
*E06B 3/67* (2006.01)
(Continued)

(52) U.S. Cl.
CPC ...... *C03C 17/3435* (2013.01); *C03C 17/3417* (2013.01); *C03C 17/3423* (2013.01);
(Continued)

(58) Field of Classification Search
CPC ......... B32B 17/10201–10229; C03C 17/3417; C03C 17/3423; C03C 17/3429;
(Continued)

(56) References Cited

U.S. PATENT DOCUMENTS

2007/0188871 A1* 8/2007 Fleury ................. C03C 17/3435
                                                           359/586
2009/0130349 A1* 5/2009 Alvarez .............. C03C 17/3441
                                                               428/34
(Continued)

FOREIGN PATENT DOCUMENTS

| WO | WO 2015/183681 A1 | 12/2015 | |
| WO | WO 2020/035818 A1 | 2/2020 | |
| WO | WO-2020065664 A1 * | 4/2020 | ......... C03C 17/3626 |

OTHER PUBLICATIONS

International Search Report mailed on Jan. 4, 2022 in PCT/EP2021/074698 filed on Sep. 8, 2021 (4 pages).

*Primary Examiner* — Z. Jim Yang
(74) *Attorney, Agent, or Firm* — Oblon, McClelland, Maier & Neustadt, L.L.P.

(57) ABSTRACT

A coated glass sheet including a glass substrate and a UV reflecting coating on at least one major surface of the glass substrate. The UV reflecting coating consists of first, second, and third layers in this order moving away from the glass substrate, where the first and third layers include a dielectric material selected from the group consisting of a mixed oxide of titanium and zirconium, and a mixed nitride of zirconium and silicon, and the second layer includes silicon oxide SiOx.

9 Claims, 3 Drawing Sheets

(51) Int. Cl.
*E06B 9/24* (2006.01)
*G02B 1/115* (2015.01)
*C03B 27/00* (2006.01)

(52) U.S. Cl.
CPC .............. *E06B 3/6715* (2013.01); *E06B 9/24* (2013.01); *G02B 1/115* (2013.01); *C03B 27/00* (2013.01); *C03C 2217/70* (2013.01); *C03C 2217/734* (2013.01)

(58) Field of Classification Search
CPC .............. C03C 17/3435; C03C 17/366; C03C 17/3681; C03C 2217/21–216; C03C 2217/218; C03C 2217/22; C03C 2217/228–244; C03C 2217/73; C03C 2217/734; C03C 2217/74; C03C 2217/77; G02B 5/281; G02B 5/282; G02B 5/283; G02B 5/285; G02B 5/286
See application file for complete search history.

(56) References Cited

U.S. PATENT DOCUMENTS

| | | |
|---|---|---|
| 2014/0078589 A1 | 3/2014 | Fujii et al. |
| 2014/0168760 A1* | 6/2014 | Theios ................ C03C 17/3681 359/359 |
| 2015/0345206 A1* | 12/2015 | Vikor .................. C03C 17/3644 428/34 |
| 2016/0041319 A1* | 2/2016 | Hicks ........................ B44F 1/02 359/359 |
| 2016/0109628 A1* | 4/2016 | Weber .................. G02B 5/0816 359/359 |
| 2016/0137850 A1* | 5/2016 | Ridealgh .............. A01M 29/08 427/248.1 |
| 2017/0020123 A1* | 1/2017 | Arnold ................ B23K 26/0006 |
| 2017/0066926 A1* | 3/2017 | Frantz .................... B05D 3/007 |
| 2017/0208796 A1* | 7/2017 | Thompson .......... C03C 17/3417 |
| 2017/0217831 A1* | 8/2017 | Hart .................... C03C 17/2453 |
| 2018/0180776 A1 | 6/2018 | Vikor et al. |
| 2018/0222793 A1* | 8/2018 | Ridealgh ............ C03C 17/3417 |
| 2019/0002341 A1 | 1/2019 | Mahieu |
| 2019/0041550 A1* | 2/2019 | Ganjoo ................ C23C 14/086 |
| 2019/0084874 A1* | 3/2019 | Weng .................. C03C 17/3618 |
| 2019/0218140 A1* | 7/2019 | Mercadier .......... C03C 17/3642 |
| 2020/0024185 A1* | 1/2020 | Lee ........................ C23C 14/10 |
| 2021/0222486 A1* | 7/2021 | Veerasamy ........... E06B 3/6722 |
| 2022/0026611 A1* | 1/2022 | Wuillaume ........... E06B 3/6715 |
| 2022/0267197 A1* | 8/2022 | Langlais ................. C03C 15/00 |
| 2024/0093549 A1* | 3/2024 | Bertin-Mourot ...... C03C 17/002 |

\* cited by examiner

TEMPERABLE UV REFLECTING COATED GLASS SHEET

CROSS REFERENCE TO RELATED APPLICATIONS

This application is a National Stage entry under 35 U.S.C. § 371 of PCT/EP2021/074698, filed on Sep. 8, 2021, and claims priority to European Patent application Ser. No. 20/195572.1, filed on Sep. 10, 2020. The entire contents of both are incorporated herein by reference.

TECHNICAL FIELD

This invention relates to a coated glass sheet that can be tempered and that bears a coating which reflects ultraviolet (UV) radiation from the sun. The coated glass sheet of the present invention may in particular be assembled with one or more glass sheets in an insulating glass unit (IGU), with the surface of the glass sheet bearing the UV reflecting coating destined to face the outside of a building. The UV reflecting coating is useful for reflecting UV radiation so that birds are capable of more easily seeing the window. Furthermore the UV reflecting coating is useful for reducing transmittance of ultraviolet radiation so that detrimental effects of UV light inside a building, such as fading of colors or yellowing of fabrics for example, are reduced or even prevented. For these purposes the wavelength range between 315 and 390 nm is the most important. The UV reflecting coating may be patterned in certain example embodiments.

The coated glass sheet of the present invention can be tempered, that is it can optionally undergo thermal heat strengthening well known in the art of glazing manufacture, without deterioration, in particular without significant increase of haze.

BACKGROUND ART

Window units reflecting ultraviolet light for reducing bird collisions are disclosed in WO2015183681A1. Whereas these glazings show adequate performance regarding the level of UV reflectance, defects tend to appear in the UV reflecting coating upon tempering of the coated glass. In particular the haze levels of these coatings increase significantly upon tempering, even giving the coated glass a milky white appearance.

SUMMARY OF INVENTION

The present invention concerns a coated glass sheet comprising a glass substrate and on at least one major surface of the glass substrate a UV reflecting coating, wherein the UV reflecting coating comprises at least first, second, and third layers in this order moving away from the glass substrate, and wherein the first and third layers comprise a dielectric material chosen among a mixed oxide of titanium and zirconium, or a mixed nitride of zirconium and silicon and the second layer comprises silicon oxide $SiO_x$. The second layer may comprise up to 20 at % of aluminium.

Advantageously, the mixed oxide of titanium and zirconium, and mixed nitride of zirconium and silicon according to the invention have an absorption coefficient k at a wavelength of 550 nm lower than 0.1, and a refractive index n at a wavelength of 550 nm comprised between 2.1 and 2.8. The first and third layers may have differing compositions. Mixed oxide of titanium and zirconium, and mixed nitride of zirconium and silicon are generally preferred for their particular resistance to heat treatments. More preferably, the first and third layers essentially consist(s) of $Ti_{x1}Zr_{y1}O_{z1}$ or of $Si_{x2}Zr_{y2}N_{z2}$.

$Ti_{x1}Zr_{y1}O_{z1}$ (TZO) is a mixed oxide of titanium and zirconium, comprising at least 35% by weight of titanium oxide, preferably at least 40% by weight of titanium oxide, more preferably at least 50% of titanium oxide. The expression "layer essentially consisting of $Ti_{x1}Zr_{y1}O_{z1}$" is also understood to encompass layers doped with at least one other element and containing up to at most about 10% by weight of this at least one other element, said doped layers having properties, in particular optical properties, that are practically no different from those of pure $Ti_{x1}Zr_{y1}O_{z1}$ layers (for example, layers deposited by cathode sputtering processes using a TiZr target containing up to 10% by weight Al).

$Si_{x2}Zr_{y2}N_{z2}$ (SZN), is a mixed nitride of silicon and zirconium, comprising an atomic ratio of Zr to the sum Si+Zr, y2/(x2+y2), which is between 10.0% and 40.0%, these values being incorporated, indeed even between 15.0% and 25.0%. The expression "layer essentially consisting of $Si_{x2}Zr_{y2}N_{z2}$" is also understood to encompass layers doped with at least one other element and containing up to at most about 10% by weight of this at least one other element, said doped layers having properties, in particular optical properties, that are practically no different from those of pure $Si_{x2}Zr_{y2}N_{z2}$ layers (for example, layers deposited by cathode sputtering processes using a SiZr target containing up to 10% by weight Al).

Advantageously, the second layer comprising $SiO_x$ has an absorption coefficient k at a wavelength of 550 nm lower than 0.1, and a refractive index n at a wavelength of 550 nm lower than 1.9, preferably lower than 1.8, more preferably comprised between 1.4 and 1.8. Oxides of silicon are preferred for their particular resistance to heat treatments. More preferably, the second layer essentially consists of silicon oxide (SiOx, with x comprised between 1.6 and 2.1), still more preferably the second layer essentially consists of $SiO_2$. The expression "layer essentially consisting of oxides of silicon" is also understood to encompass layers doped with at least one other element and containing up to at most about 20% by weight of this at least one other element, said doped layers having dielectric properties that are practically no different from those of pure silicon oxide layers (for example, layers deposited by cathode sputtering processes using a SiAl target containing up to 20% by weight Al, for example about 10% Al). Advantageously, the second layer comprising $SiO_x$ comprises nitrogen at a N/O atomic ratio less than 10% nitrogen, more advantageously less than 5%, even more advantageously less than 1%. Indeed, the presence of nitrogen tends to increase the refractive index of the second layer and reduce the UV reflecting coating's performances.

The inventors have found that a coated glass sheet according to the present invention
a. reflects at least 25% of UV radiation in at least a substantial part of the range from 315 nm to 390 nm and
b. maintains this level of UV reflection after heat treatment,
c. as well as a haze level below 0.1% after heat treatment. In particular the inventors found that this performance is due to the particular choices of dielectrics for the first and third layers in the coating. Furthermore the variations due to heat treatment in transmitted and reflected colors are very low.

In some cases an operation to mechanically reinforce the glazing, such as thermal toughening of the glass sheet or sheets, is necessary to improve the resistance to mechanical stresses. For particular applications, it may also become necessary to give the glass sheets a more or less complex curvature by means of a bending operation at high temperature. In the processes of production and shaping of glazing systems there are certain advantages for conducting these heat treatment operations on the already coated substrate instead of coating an already heat treated substrate. These operations are conducted at a relatively high temperature, which is the temperature at which certain layer stacks tend to deteriorate and may lose its optical properties or develop visible defects. These heat treatments, to which the coated glass sheets of the present invention resist, consist in particular of heating the glass sheet to a temperature higher than 560° C. in air, e.g. between 560° C. and 700° C., and in particular between 640° C. to 680° C., for a period of between 3 and 15 minutes, depending on the type of treatment and the thickness of the sheet. In the case of a bending treatment, the glass sheet may then be bent to the desired shape. The toughening treatment then consists of abruptly cooling the surface of the flat or bent glass sheet by air jets or cooling fluid to obtain a mechanical reinforcement of the sheet.

Therefore, in the case where the coated glass sheet must undergo a heat treatment, quite specific precautions must be taken to form a coating structure that is able to withstand a thermal toughening and/or bending treatment, sometimes referred to hereafter by the term "temperable", without losing the optical and/or energy properties it has been created for. In particular, the dielectric materials used to form the dielectric coatings must withstand the high temperatures of the heat treatment without exhibiting any adverse structural modification. In certain example embodiments of this invention, a window is designed to prevent or reduce bird collisions therewith. In certain example embodiments, the window may comprise an insulating glass window unit (IGU). In IGU embodiments, the IGU includes first and second substrates (e.g., glass substrates) spaced apart from one another, wherein at least one of the substrates supports ultraviolet (UV) reflecting coating according to the present invention so that birds are capable of more easily detecting the presence of the window. By making the window more visible to birds in such a manner, bird collisions and thus bird deaths can be reduced.

In certain example embodiments, there is provided an IGU comprising: a first coated glass sheet according to the present invention; a second glass substrate spaced apart from the first glass substrate; the UV reflecting coating is provided on the first glass substrate and on an exterior surface of the IGU so as to face an exterior of a building in which the IGU is to be mounted; a functional coating, such as a low emissivity coating, provided on the other side of the first glass substrate, so that the first glass substrate supports and is located between the UV reflecting coating and the low-E coating; wherein the UV reflecting coating is not part of a low-E coating and does not contain any IR reflecting layer of silver or gold; advantageously the UV reflecting coating is patterned so that the UV reflecting coating is not provided continuously across the entire first substrate; wherein the UV reflecting coating comprises at least first, second, and third layers in this order moving away from the first glass substrate, and wherein the first and third layers comprise a dielectric material chosen among a mixed oxide of titanium and zirconium, or a mixed nitride of zirconium and silicon and the second layer comprises silicon oxide SiOx. The UV reflecting coating reflects at least 25% of UV radiation in at least a substantial part of the range from 315 nm to 390 nm and maintains this level of UV reflection after heat treatment as well as a haze level below 0.1% after heat treatment. Furthermore the variations due to heat treatment in transmitted and reflected colors are very low. Advantageously, $\Delta E^*$ of transmitted or reflected colors, due to the heat treatment may be less than 5, more advantageously less than 3, even more preferably less than 2.

The following information is used in the present invention:
  a. light transmission (LT) is the percentage of incident light flux, illuminant D65/2°, transmitted by the glazing;
  b. light reflection (LR) is the percentage of incident light flux, illuminant D65/2°, reflected by the glazing. It may be measured on the external side of the building or vehicle (LRext) or the internal side of the building or vehicle (LRint);
  c. energy transmission (ET) is the percentage of incident energy radiation transmitted by the glazing calculated in accordance with standard EN410;
  d. energy reflection (ER) is the percentage of incident energy radiation reflected by the glazing calculated in accordance with standard EN410. It may be measured on the external side of the building or vehicle (ERext) or the internal side of the building or vehicle (ERint);
  e. solar factor (SF or g) is the percentage of incident energy radiation that is directly transmitted by the glazing, on the one hand, and absorbed by this, then radiated in the opposite direction to the energy source in relation to the glazing. It is here calculated in accordance with standard EN410;
  f. the U value (coefficient k) and emissivity ($\varepsilon$) are calculated in accordance with standards EN673 and ISO 10292;
  g. the CIELAB 1976 values (L*a*b*) are used to define the tints of reflected and transmitted light. They are measured with illuminant D65/10°;
  h. $\Delta E^* = \sqrt{(\Delta L^*)^2 + (\Delta a^*)^2 + (\Delta b^*)^2}$ represents the tint variation, i.e. variations of transmitted or reflected colors, due to the heat treatment, i.e. the color difference before and after heat treatment;
  i. The haze level is measured on single glass sheets according to standard D1003-95, using a white light source, for example using a BYK-Gardner Haze-gard measurement apparatus;
  j. the resistance per square (R2) ("sheet resistance"), expressed in ohms per square ($\Omega/\square$), measures the electrical resistance of thin films;
  k. When values are referred to as "in the range of between a and b" or "from a to b", they may be equal to a or b.

The positioning of the stack of layers in a multiple glazing unit is given according to the usual sequential numbering of the faces of a glazing unit, face 1 being on the exterior of the building or vehicle and face 4 (in the case of a double glazing unit) or face 6 (in the case of a triple glazing unit) on the interior.

For the sake of clarity, when using terms like "below", "above", "lower", "upper", "first" or "last" herein, it is always in the context of a sequence of layers starting from the glass substrate below, going upward, further away from the glass. Such sequences may comprise additional intermediate layers, in between the defined layers, except when a direct contact is specified.

BRIEF DESCRIPTION OF DRAWINGS

These and further aspects of the invention will be explained in greater detail by way of example and with reference to the accompanying drawings in which.

Figure 1:
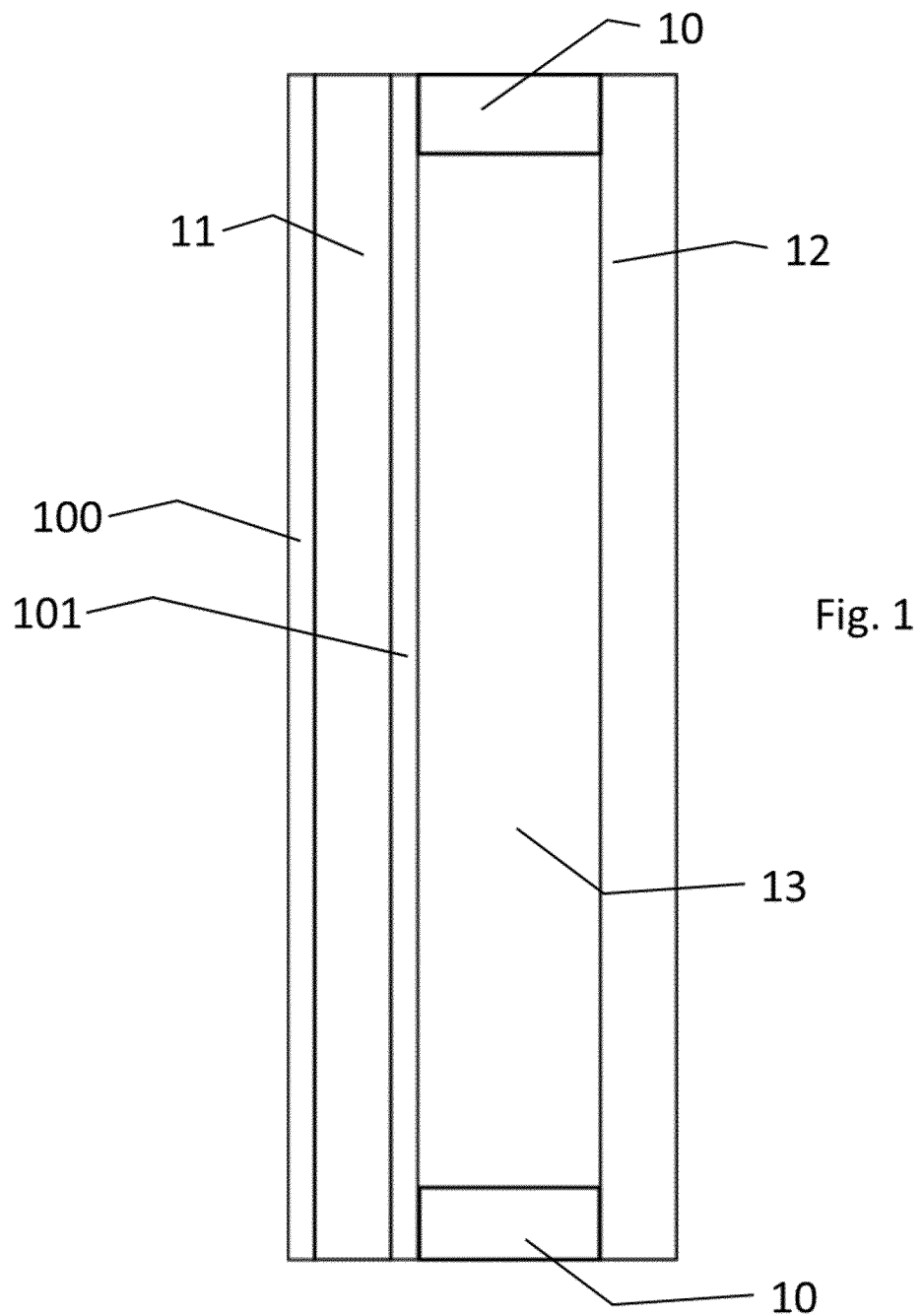
FIG. 1 is a cross sectional view of an IGU according to an example embodiment of this invention.

The Figures are not drawn to scale.

DESCRIPTION OF EMBODIMENTS

In certain embodiments of the present invention the first layer is in direct contact with the substrate and with the second layer and the third layer is in direct contact with the second layer. In particular, the UV reflecting coating may comprise no other layer than the first, second and third layers, that is it consists of the first, second and third layers. It was found that this represents the most economical, heat treatable UV reflecting coating, that still showed acceptable UV reflecting performance.

The UV reflecting coating of the present invention may comprise a fourth layer above the third layer, moving away from the glass substrate, wherein the fourth layer comprises silicon oxide $SiO_x$, such a coating is not part of the invention since this is a more complex one and more expansive one to manufacture. For such coating, the resulting coated glass sheet was found to reflect at least 50% of UV radiation in at least a substantial part of the range from 315 nm to 390 nm and maintains this level of UV reflection after heat treatment. Furthermore the variations due to heat treatment in transmitted and reflected colors are very low. Advantageously, the first layer is in direct contact with the substrate and with the second layer and the third layer is in direct contact with the second layer and the fourth layer.

The UV reflecting coating of the present invention may comprise a fourth and a fifth layer above the third layer, moving away from the glass substrate, wherein the fifth layer comprises a dielectric material chosen among an oxide of titanium, a mixed oxide of titanium and zirconium, or a mixed nitride of zirconium and silicon wherein the fourth layer comprises silicon oxide $SiO_x$, such a coating is not part of the invention since this is a more complex one and more expansive to manufacture. For such coating, the resulting coated glass sheet was found to reflect at least 60% of UV radiation in at least a substantial part of the range from 315 nm to 390 nm and maintains this level of UV reflection after heat treatment. Furthermore the variations due to heat treatment in transmitted and reflected colors are very low. Advantageously, the first layer is in direct contact with the substrate and with the second layer and the third layer is in direct contact with the second layer and the fourth layer and the fifth layer is in direct contact with the fourth layer.

The inventors have found that the less complex resulting coated glass sheet of the invention with only 3 layers was found to reflect already at least 30% of UV radiation in at least a substantial part of the range from 315 nm to 390 nm and maintains this level of UV reflection after heat treatment. This 3 layers coating allow a good performance combined with an easier production way. Furthermore the variations due to heat treatment in transmitted and reflected colors are very low. In particular it was found that the resulting coated glass presented easy-to-clean properties and UV induced hydrophilicity and UV induced photocatalytic effects. Advantageously, the first layer is in direct contact with the substrate and with the second layer and the third layer is in direct contact with the second layer.

In certain embodiments the glass substrate coated with the UV reflecting coating of the invention may have no haze noticeable by the human eye, even a haze level after optional heat treatment, that is, as measured, a haze level after optional heat treatment of not more than 0.04%.

In certain embodiment of the present invention the third layer is the outermost layer of the coated glass sheet.

In certain example embodiments, there is provided an IGU comprising: a first coated glass sheet the present invention, according to any of its embodiments, wherein an array of spacers (not shown) may be provided between the substrates in a viewing area of the window for spacing the substrates from one another as in the context of a vacuum IGU. The spacer(s) (10), other spacer(s), and/or peripheral seal space the two substrates (11 and 12) apart from one another so that the substrates do not contact one another and so that a space or gap (14) is defined therebetween. The space (13) between the substrates (11, 12) may be evacuated to a pressure lower than atmospheric in certain example embodiments, and/or may be filled with a gas (e.g., Ar) in certain example embodiments. Alternatively, space (13) between the substrates (11, 12) need not be filled with a gas and/or need not be evacuated to a low pressure. In certain example embodiments, it is possible to suspend foil or other radiation reflective sheet(s) (not shown) in space (13). When substrate(s) (11 and/or 12) are of glass, each glass substrate may be of the soda-lime-silica type of glass, or any other suitable type of glass, and may be for example from about 1 to 10 mm thick in certain example embodiments of this invention.

The IGU of FIG. 1 may include a functional coating (101) (e.g., a solar control or a an insulating low-emissivity coating) that is supported on an interior surface of substrate (1). Functional coating (101) comprises at least one functional, infrared reflecting, layer comprising silver, includes one or more layers, although in many embodiments it is a multilayer coating. Low-emissivity coating (101) includes at least one infrared (IR) reflecting layer (e.g., based on silver) sandwiched between at least first and second dielectric layers. Since one example function of low-emissivity coating (101) is to block (i.e., reflect and/or absorb) certain amounts of IR radiation and prevent the same from reaching the building interior, the solar management coating (101) includes at least one IR blocking (i.e., IR reflecting and/or absorbing) layer. Example IR blocking layer(s) which may be present in coating (101) are of or include silver (Ag), nickel-chrome (NiCr), gold (Au), and/or any other suitable material that blocks significant amounts of IR radiation. It will be appreciated by those skilled in the art that IR blocking layer(s) of low-E coating (101) need not block all IR radiation, but only need to block significant amounts thereof. In certain embodiments, each IR blocking layer of coating (101) is provided between at least a pair of dielectric layers. Example dielectric layers include silicon nitride, titanium oxide, silicon oxynitride, tin oxide, zinc stannate, and/or other types of metal-oxides and/or metal-nitrides. In certain embodiments, in addition to being between a pair of dielectric layers, each IR blocking layer may also be provided between a pair of contact layers of or including a material such as an oxide and/or nitride of nickel-chrome or any other suitable material. Example low-emissivity coatings (101) which may be provided on substrate (1) are described in Patents WO03106363A1, WO2004071984A1, WO2006048462A1, WO2009115595A1, WO2009115596A1, WO2009115599A1, WO2006048463A1, WO2006067102A1, WO2006122900A1, WO2007138097A1, WO2008113786A1, WO2011147875A1, WO2011147864A1, WO2013079400A1, WO2014191472A1, WO2014191474A1, WO2014191484A1, WO2014125081A1, WO2014125083A1, WO2014207171A1, all of which are hereby incorporated herein by reference. Of course, solar management coatings (101) herein are not limited to these particular coatings, and any other suitable solar management coatings capable of blocking amounts of IR radiation may instead be used. Solar management coatings (101) herein may be deposited on substrate(s) (11) and/or (12) in any suitable manner, including but not limited to sputtering, vapor deposition, and/or any other suitable technique.

Still referring to FIG. 1, the IGU further includes UV reflecting coating of the invention (100) for reflecting significant amounts of UV radiation thereby making the window more visible to birds. Coatings (100) may be sputter-deposited in example embodiments of this invention. UV reflecting coating (100) may be, for purposes of example and without limitation, the UV reflecting coatings illustrated in FIGS. 3. This increases the UV reflection of the window unit in order to make such windows more visible to birds thereby preventing or reducing bird collisions. The use of such coatings (100) herein enhances the performance of the glass or window by increasing the UV reflectance beyond the normal limits of raw uncoated plate glass in the 315 nm to 390 nm range of the spectrum. In certain example embodiments, the UV reflecting coating (100) is in direct contact with the glass substrate (11) on the exterior surface thereof, and is not part of a low-E coating. In particular, there are no IR reflecting layers (e.g., silver based, gold based, NiCr, or IR reflecting TCO-based layers) in coating (100), and there are no IR reflecting layers on the side of the substrate (11) on which the coating (100) is provided. Instead, any low-E coatings (e.g., see low-E coating 101) may be provided on the other side of substrate (11) from coating (100) or alternatively on the surface of glass substrate (12) that faces gap (13). In certain example embodiments, the UV reflecting coating 100 may block at least 38% (more preferably at least 40%, more preferably at least 55%, even more preferably at least 60%, and possibly at least 65%) of UV radiation in at least a substantial part of the range from 315 nm to 390 nm.

Figure 2:
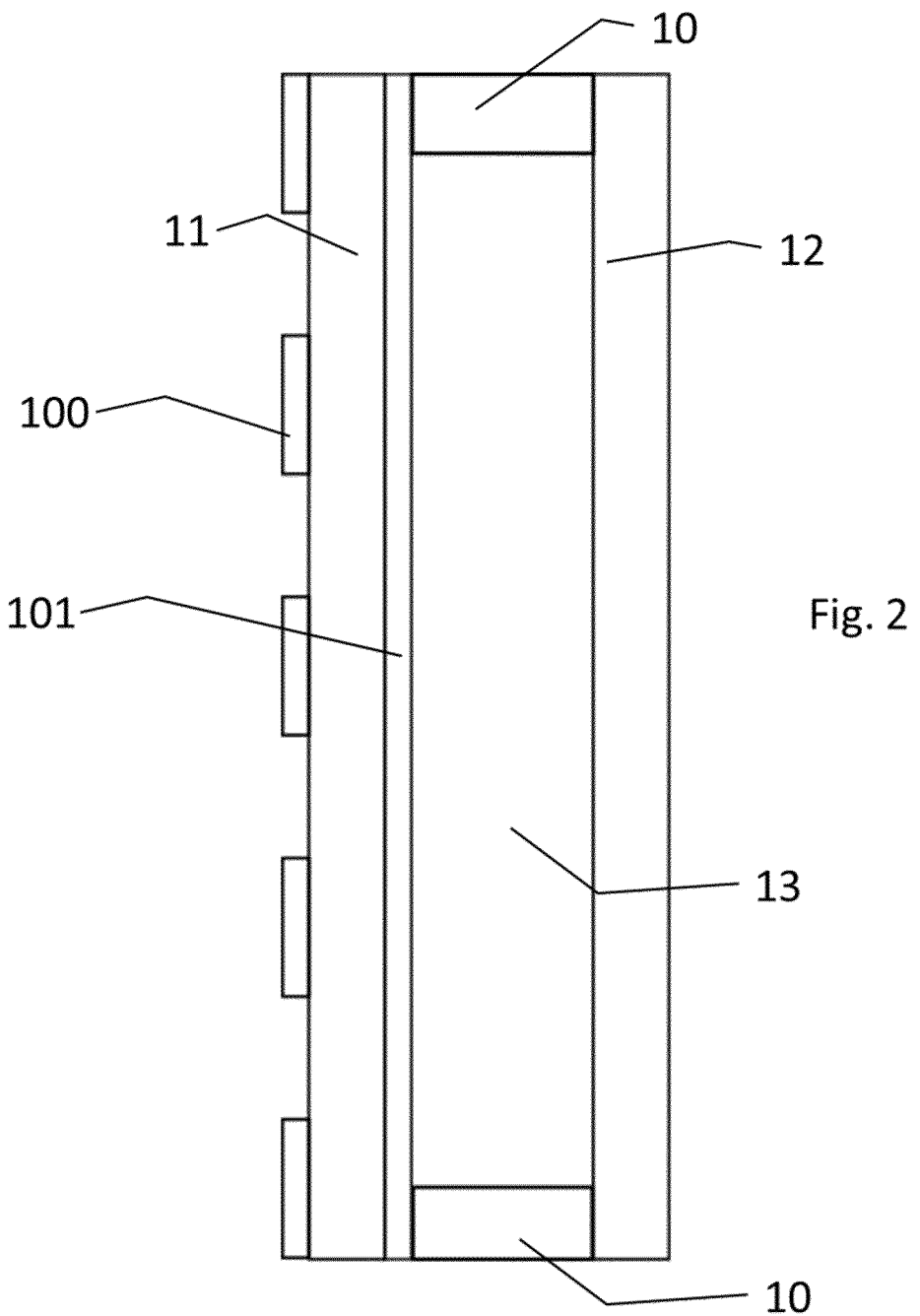
FIG. 2 is a cross sectional view of an IGU according to an example embodiment of this invention.

The UV reflecting coating (100) may be patterned (e.g., in the shape of a grid or in substantially parallel or non-parallel stripes) on the surface of substrate (1) as shown in FIG. 2, or alternatively may be provided continuously across substantially the entire surface of substrate (1) in other embodiments. The patterned shape of coating (100) may be formed as follows. A pattern (not shown) is provided on the surface of substrate (11) prior to the coating (100) being formed, with the pattern being located in areas which are ultimately to be free of coating (100). After the pattern is formed, a coating (100) is continuously formed across the entire or substantially the entire surface of substrate (1) over the pattern. The pattern can then be removed (along with the portions of coating (100) located directly over it) in order to create a patterned coating (150), so that the coating (100) remains on only the portions of the substrate where the original pattern was not deposited. Thus, a patterned coating (100) can be formed in such a manner in example embodiments of this invention. The remaining patterned coating (100) is substantially invisible to human eyes, but is visible to bird eyes as explained above. The pattern may also be formed by using masks positioned in between the sputtering targets used for the deposition of the UV reflecting coating, at least for first, third and fifth layers of this coating, and the glass substrate. A pattern may also be formed by coating the whole substrate first and by partially removing the coating afterwards, for instance by laser ablation of the coating.

In a particular embodiment the first layer and the third layer are identically patterned so that the first layer and the third layer are not provided continuously across the entire coated glass sheet and so that the second layer is provided over the entire coated glass sheet. Such a coating is easier to deposit if masks are used during deposition by sputtering. Furthermore, the second layer provide additional protection to the glass surface against chemical aggression.

It is indeed a particular advantage of the UV reflecting coatings of the present invention they are substantially invisible to human eyes. This means that the color of the reflected light of a substrate with this is very close to the color of the reflected light of the substrate without this coating. The color coordinates a* and b* of the reflected light of the substrate with this coating, a*(coated) and b*(coated), are such that they are very close to the color coordinates of the reflected light of the substrate without this coating, a*(uncoated) and b*(uncoated). In particular a*(coated) and b*(coated) may be such that a*(uncoated)−1<a*(coated)<a*(uncoated)+1 and b*(uncoated)−1<b*(coated)<b*(uncoated)+1. The substrate may bear a coating on the opposite side to the UV reflecting coating and/or be part of a multiple glazing, in which cases the same applies.

As shown in FIG. 1, IG units which have two glass substrates (11) and (12) typically are characterized as having four surfaces. In particular, surface #1 faces the building exterior, surface #2 is the interior coated/uncoated surface of the same substrate (11) but faces the interior space/gap (13) of the IG unit, surface #3 is the interior coated/uncoated surface of the other substrate (30) facing the interior space/gap (17), and surface #4 faces the building interior. In the FIG. 1 embodiment, UV reflecting coating (100) is provided on surface #1 and the low-E coating (101) is provided on surface #2. This is a preferred arrangement of the coatings, as it enables much IR radiation to be blocked and much UV to be reflected before reaching space (17). However, in alternative embodiments of this invention, the positions of coatings (101) and (100) may be changed (e.g., coating (101) could be provided on surface #3). The solar management coating (101) of the FIG. 1 embodiment may be a low-E coating in certain embodiments of this invention. In certain example embodiments, before and/or after optional heat treatment (e.g., thermal tempering and/or heat bending), the coating (101) in the FIG. 1 embodiment may have a sheet resistance (Rs) of no greater than 8 ohms/square, more preferably no greater than 6 ohms/square, and most preferably no greater than 4 ohms/square. In certain embodiments, the coating (101) may have an emissivity (En) after heat treatment of no greater than 0.10, more preferably no greater than 0.07, and even more preferably no greater than 0.05 (before and/or after optional heat treatment).

Figure 3:
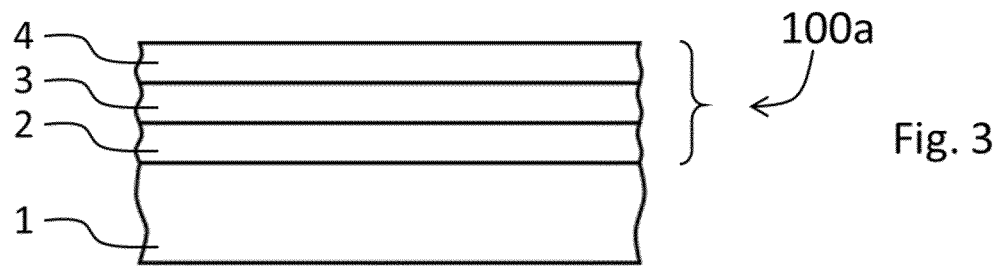
FIG. 3 is cross sectional view of a UV reflecting coating on a glass substrate, which may be used in the IGU of FIG. 1 or FIG. 2 according to example embodiments of this invention.

FIG. 3 is cross sectional view of UV reflecting coatings (100) that may be used on substrate (1) in the IGU of FIG. 1 in example embodiments of this invention. Glass substrate (1) may be soda-lime-silica based glass or any other suitable type of glass, and may be from about 1-12 mm thick, more preferably from about 2-6 mm thick, in example embodiments of this invention.

In the embodiments illustrated by FIG. 3, coating (100) includes, in sequence starting from the glass substrate (1), first and third layers (2,4) that comprise a dielectric material chosen among a mixed oxide of titanium and zirconium, or a mixed nitride of zirconium and silicon and a second layer (3) comprising SiOx.

In certain example embodiments of this invention illustrated by FIG. 3, the first layer (2) may be from about 3 to 12 nm thick, more preferably from about 3 to 10 nm thick, even more preferably from about 3 to 8 nm thick, with an example thickness being from about 4 to 6 nm and the second layer (3) may be from about 40 to 75 nm thick, more preferably from about 45 to 70 nm thick, even more preferably from about 50 to 65 nm thick, with an example thickness being from about 55 to 60 nm and the third layer (4) may be from about 13 to 32 nm thick, more preferably from about 15 to 30 nm thick, even more preferably from about 18 to 28 nm thick, with an example thickness being from about 20 to 25 nm.

Figure 4:
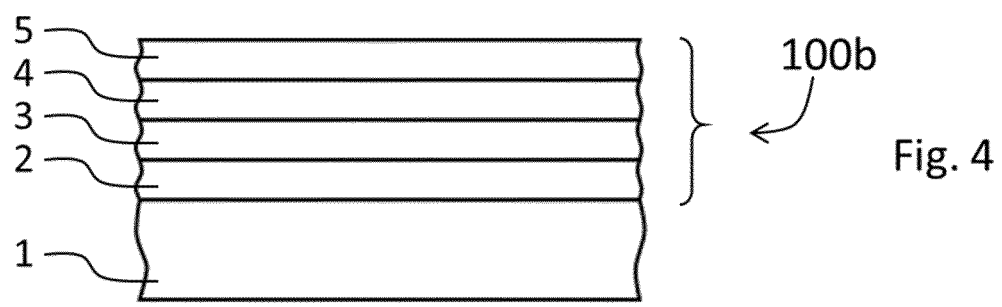
FIG. 4 is cross sectional view of another UV reflecting coating on a glass substrate which is more complex and not part of this invention.

In the non-example of the invention illustrated by FIG. 4, coating (100b) includes, in sequence starting from the glass substrate (1), first and third layers (2,4) that comprise a dielectric material chosen among a mixed oxide of titanium and zirconium, or a mixed nitride of zirconium and silicon and second and fourth layers (3,5) comprising SiOx.

Figure 5:
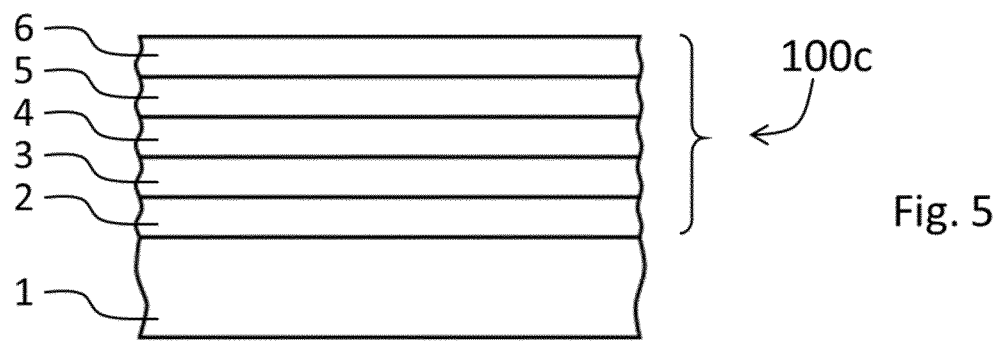
FIG. 5 is cross sectional view of another UV reflecting coating on a glass substrate which is more complex and not part of this invention.

In certain non-examples illustrated by FIG. 4, the first layer (2) may be from about 8 to 30 nm thick, more preferably from about 10 to 25 nm thick, even more preferably from about 10 to 20 nm thick, with an example thickness being from about 13 to 16 nm and the second layer (3) may be from about 55 to 85 nm thick, more preferably from about 55 to 80 nm thick, even more preferably from about 60 to 80 nm thick, with an example thickness being from about 65 to 78 nm and the third layer (4) may be from about 15 to 35 nm thick, more preferably from about 18 to 32 nm thick, even more preferably from about 20 to 30 nm thick, with an example thickness being from about 22 to 28 nm and the fourth layer (5) may be from about 85 to 105 nm thick, more preferably from about 87 to 105 nm thick, even more preferably from about 90 to 100 nm thick, with an example thickness being from about 92 to 98 nm In the non-example of the invention illustrated by FIG. 5, coating (100c) includes, in sequence starting from the glass substrate (1), first and third layers (2,4) that comprise a dielectric material chosen among a mixed oxide of titanium and zirconium, or a mixed nitride of zirconium and silicon, fifth layer (6) that may comprise an oxide of titanium, or a mixed oxide of titanium and zirconium, or a mixed nitride of zirconium and silicon and second and fourth layers (3,5) comprising SiOx.

In certain non-examples illustrated by FIG. 5, the first layer (2) may be from about 18 to 38 nm thick, more preferably from about 20 to 35 nm thick, even more preferably from about 22 to 33 nm thick, with an example thickness being from about 25 to 30 nm and the second layer (3) may be from about 28 to 50 nm thick, more preferably from about 30 to 45 nm thick, even more preferably from about 33 to 43 nm thick, with an example thickness being from about 35 to 40 nm and the third layer (4) may be from about 28 to 55 nm thick, more preferably from about 32 to 50 nm thick, even more preferably from about 35 to 48 nm thick, with an example thickness being from about 38 to 44 nm and the fourth layer (5) may be from about 55 to 75 nm thick, more preferably from about 58 to 73 nm thick, even more preferably from about 60 to 70 nm thick, with an example thickness being from about 62 to 68 nm and the fifth layer (6) may be from about 2 to 20 nm thick, more preferably from about 5 to 18 nm thick, even more preferably from about 5 to 15 nm thick, with an example thickness being from about 8 to 12 nm.

The layers (2-4) of the UV reflecting coating (100a) are preferably deposited by sputtering in example embodiments of this invention. For example, layers comprising an oxide of titanium (6) or layers comprising a mixed oxide of titanium and zirconium, or a mixed nitride of zirconium and silicon (2,4) may be sputter deposited via at least one metallic target of titanium, titanium-zirconium alloy or zirconium-silicon alloy respectively, via sputtering in an atmosphere including a mixture of argon and reactive oxygen gases or of argon and reactive nitrogen respectively. And for example, the layer comprising silicon oxide SiOx (3) may be sputter deposited via at least one sputtering target of or including Si or SiAl, via sputtering in an atmosphere including a mixture of argon and reactive oxygen gases. Rotating C-Mag sputtering targets, or other types of targets, may be used. In sputtering operations, sufficient reactive oxygen or nitrogen gas may be used to achieve the refractive index values discussed herein. Ceramic targets may alternatively be used to sputter deposit one or more of these layers. While the layers of the UV reflecting coating (100a, b,c) are preferably deposited via sputtering, it is possible that they may be deposited via other techniques in alternative embodiments of this invention. In particular layers comprising SiOx (3) may be deposited by plasma enhanced chemical vapor deposition (PECVD), in particular hollow cathode PECVD.

The present invention further concerns an insulated glazing unit (IGU) comprising a coated glass substrate according to any one of the embodiments of this invention described above.

In example embodiments of this invention, there is provided an IGU comprising:
  a. a first glass substrate;
  b. a second glass substrate spaced apart from the first glass substrate;
  c. a UV reflecting coating provided on a first side the first glass substrate and on an exterior surface of the IGU so as to face an exterior of a building in which the IGU is to be mounted;
  d. optionally, a low-emissivity coating provided on the second side of the first glass substrate, so that the first glass substrate supports and is located between the UV reflecting coating and the low-emissivity coating;
  e. wherein the UV reflecting coating is not part of any low-emissivity coating and does not contain any infrared (IR) reflecting layer of silver or gold;
  f. wherein the UV reflecting coating is optionally patterned so that the UV reflecting coating is not provided continuously across the entire first substrate;
  g. wherein the UV reflecting coating comprises first and third layers that comprise a dielectric material chosen among a mixed oxide of titanium and zirconium, or a mixed nitride of zirconium and silicon and a second layer comprising SiOx;
  h. and wherein the IGU has a visible transmission of at least about 20%, and the UV reflecting coating reflects at least 25% of UV radiation in at the whole range from 315 nm to 390 nm;

i. and wherein the first glass substrate coated with the UV reflecting coating and with the low-emissivity coating has a haze level after optional heat treatment of not more than 0.1%.

In the IGU of the immediately preceding paragraph, the UV reflecting coating may reflect at least 25% of UV radiation in the whole range from 315 nm to 390 nm and may reflect on average 30% in the range from 315 nm to 390 nm. Additionally, the IGU of the immediately preceding paragraph, the UV reflecting coating may reduce the transmittance of UV radiation by at least 15% in the whole range from 315 to 390 nm and may reduce the average transmittance of UV radiation by at least 25% in the range from 315 nm to 390 nm.

In the IGU of any of the preceding four paragraphs, the low-E coating may comprise first and second IR blocking layers each comprising Ag, at least one dielectric layer provided between the first IR blocking layer and the first substrate, at least another dielectric layer provided between the first and second IR blocking layers, and wherein the low-E coating supported by the first substrate has an emissivity (En) of no greater than 0.10 and/or a sheet resistance (Rs) of no greater than 8 ohms/square.

In the IGU of any of the preceding five paragraphs, the first and second glass substrates may be spaced apart from one another by at least one spacer and/or edge seal so as to define a space between the substrates. The space between the substrates may be filled with a gas and/or is evacuated to a pressure less than atmospheric.

In the IGU of any of the preceding six paragraphs, the first glass substrate coated with the UV reflecting coating and with the low-emissivity coating may have no measurable haze level after optional heat treatment, that is, as measured, a haze level after optional heat treatment of not more than 0.04%.

According to an embodiment of the present invention the glass substrate bearing the UV reflecting coating may be a laminate of at least two glass sheets. In such a laminate, at least two glass sheets are joined by a sheet of polyvinylbutate (PVB) or ethyl-vinylactetate (EVA).

The invention is not limited to the substrate being a glazing in a building. For example, the substrate may be a door, a balcony, a spandrel, or a part of any of these.

The present invention in certain embodiments concerns the following items:

Item 1. Coated glass sheet comprising a glass substrate and on at least one major surface of the glass substrate a UV reflecting coating, wherein the UV reflecting coating consists of first, second, and third layers in this order moving away from the glass substrate, and wherein the first and third layers comprise a dielectric material chosen among a mixed oxide of titanium and zirconium, or a mixed nitride of zirconium and silicon and the second layer comprises silicon oxide SiOx.

Item 2. Coated glass sheet according to item 1, wherein the first layer (2) is from 3 to 12 nm thick, and the second layer (3) is from 40 to 75 nm thick and the third layer (4) is from 13 to 32 nm thick, Item 3. Coated glass sheet according to any preceding item characterized in that the first layer is in direct contact with the glass and the second layer, and in that the third layer is in direct contact with the second.

Item 4. Coated glass sheet according to any preceding item, wherein the second layer (3) comprises up to 20 at % of aluminium.

Item 5. Coated glass sheet according to any of the claims 1 to 4, wherein the first layer (2) and/or the third layer (4) is a mixed oxide of titanium and zirconium, comprising at least 35% by weight of titanium oxide Item 6. Coated glass sheet according to any of the claims 1 to 4, wherein the first layer (2) and/or the third layer (4) is a mixed nitride of silicon and zirconium, comprising an atomic ratio of Zr to the sum Si+Zr, which is between 10.0% and 40.0%

Item 7. Coated glass sheet according to any preceding item wherein the UV reflecting coating is patterned so that the UV reflecting coating is not provided continuously across the entire coated glass sheet.

Item 8. Coated glass sheet according to any of the preceding claim characterized in that the first layer and the third layer are identically patterned so that the first layer and the third layer are not provided continuously across the entire coated glass sheet and so that the second layer is provided over the entire coated glass sheet.

Item 9. Insulated glazing unit comprising a first coated glass sheet according to any preceding item and further comprising at least one other glass sheet wherein the first coated glass sheet's UV reflecting coating is provided on an exterior surface of the insulated glazing unit.

Item 10. Insulated glazing unit according to item 9 further comprising on the second side of the first coated glass sheet a low-emissivity coating.

Examples

In the following examples were all layers were deposited using magnetron sputtering on 4 mm thick normal clear soda lime glass. Examples 1, and 5 are according to the present invention. Example 4 is a comparative example. Examples 2 and 3 give good results but are not examples of the invention because there are more complex to manufacture. Table 1 below indicates the materials of the different layers and their physical thickness. TZO denotes a mixed oxide of titanium and zirconium mixed oxide which comprises 65% by weight of titanium oxide and 35% by weight of zirconium oxide. $TiO_x$ denotes an oxide of titanium with x comprised between 1.8 and 2.2. SZN denotes a mixed nitride of silicon and zirconium, comprising an atomic ratio of Zr to the sum Si+Zr, which is between 10.0% and 40.0%.

TABLE 1

| Example | 1$^{st}$ layer | 2$^{nd}$ layer | 3$^{rd}$ layer | 4$^{th}$ layer | 5$^{th}$ layer |
| --- | --- | --- | --- | --- | --- |
| 1 | TZO 5 nm | SiO$_2$ 60 nm | TZO 22 nm | | |
| 2 | TZO 15 nm | SiO$_2$ 72 nm | TZO 25 nm | SiO$_2$ 95 nm | |
| 3 | TZO 27 nm | SiO$_2$ 38 nm | TZO 42 nm | SiO$_2$ 65 nm | TZO 10 nm |
| 4 | TiO$_x$ 15 nm | SiO$_2$ 72 nm | TiO$_x$ 25 nm | SiO$_2$ 95 nm | |
| 5 | SZN 5 nm | SiO$_2$ 60 nm | SZN 22 nm | | |

Optical properties were determined for double glazing units comprising one example glass sheet and one uncoated 4 mm thick clear soda lime glass sheets separated by a 16 mm wide gap which is filled with an argon/air mixture comprising 90% by volume of argon, with one of the sheets being the respective examples above. Table 2 below shows the optical performances in a double glazing IGU obtained without heat treatment of the substrate bearing the UV reflecting coating. The UV reflecting coating is always in position 1, that is turned towards the exterior. The UV reflectance in the range from 315 nm to 390 nm is always determined on the side of the IGU bearing the UV reflecting coating; which is the side that faces outwards on a building. The Transmittance Reduction in the range from 315 nm to 390 nm is the transmittance difference between an IGU without any coating and the IGUs made with the respective example coated glass sheets.

TABLE 2

| Example | Minimum Reflectance 315 nm to 390 nm | Minimum Transmittance Reduction 315 nm to 390 nm | Average Reflectance 315 nm to 390 nm | Average Transmittance Reduction 315 nm to 390 nm |
| --- | --- | --- | --- | --- |
| 1 (IGU) | 25% | 16% | 32% | 25% |
| 2 (IGU) | 25% | 17% | 40% | 38% |
| 3 (IGU) | 40% | 30% | 62% | 52% |
| 4 (IGU) | 25% | 17% | 40% | 38% |
| 5 (IGU) | 25% | 16% | 32% | 25% |

Examples 1 to 5 were submitted to a heat treatment in a static furnace at 670° C. for a duration of four minutes. Examples 1, 2, 3, and 5 show essentially the same optical properties after this heat treatment as before. In addition on these samples the haze level before heat treatment and after heat treatment was below 0.1%. ΔE* of transmitted and reflected colors, due to the heat treatment were less than 5. On Example 4 the optical properties are modified upon heat treatment and in particular the haze level rises far above the initial 0.1% and is visible by the naked eye.

It should be noted that the minimum reflectance and minimum transmittance reduction in samples 1 and 2 is very similar and that an improvement is obtained only when a fifth layer is used. This shows that a 3 layers coating is a good compromise regarding fabrication and performances.

An additional Example was made which is the same as Example 1 except that the third layer was replaced by a layer of $TiO_x$. All optical performances were similar within +/−3%. Interestingly this UV reflecting coating showed the additional property of being more hydrophilic than examples 1, even more so after heat treatment. Even the haze level was maintained below 0.1% after heat treatment.

The invention is not limited to the substrate being a glazing in a building. For example, the substrate may be a door, a balcony, a spandrel.

The invention claimed is:
1. A coated glass sheet comprising:
a glass substrate; and
a UV reflecting coating on at least one major surface of the glass substrate,
wherein the UV reflecting coating consists of first, second, and third layers in this order moving away from the glass substrate,
wherein the first and third layers comprise a dielectric material selected from the group consisting of a mixed oxide of titanium and zirconium, and a mixed nitride of zirconium and silicon,
the second layer comprises silicon oxide SiOx,
wherein the first layer and the third layer are identically patterned so that the first layer and the third layer are not provided continuously across the entire coated glass sheet, and
wherein the second layer is provided over the entire coated glass sheet.

2. The coated glass sheet according to claim 1, wherein the first layer is from 3 to 12 nm thick, the second layer is from 40 to 75 nm thick, and the third layer is from 13 to 32 nm thick.

3. The coated glass sheet according to claim 1, wherein the first layer is in direct contact with the glass and the second layer, and
wherein the third layer is in direct contact with the second layer.

4. The coated glass sheet according to claim 1, wherein the third layer is an outermost layer of the coated glass sheet.

5. The coated glass sheet according to claim 1, wherein the second layer comprises up to 20 wt. % of aluminium.

6. The coated glass sheet according to claim 1, wherein the first layer and/or the third layer is a mixed oxide of titanium and zirconium, comprising at least 35% by weight of titanium oxide.

7. The coated glass sheet according to claim 1, wherein the first layer and/or the third layer is a mixed nitride of silicon and zirconium, comprising an atomic ratio of Zr to the sum Si+Zr, between 10.0% and 40.0%.

8. An insulated glazing unit comprising:
a first coated glass sheet according to claim 1; and
at least one other glass sheet,
wherein the UV reflecting coating on the first coated glass sheet is provided on an exterior surface of the insulated glazing unit.

9. The insulated glazing unit according to claim 8, further comprising:
a low-emissivity coating on a second side of the first coated glass sheet.

* * * * *